United States Patent [19]

Olmr et al.

[11] Patent Number: 5,524,507
[45] Date of Patent: Jun. 11, 1996

[54] CONNECTING ROD

[75] Inventors: Jaroslav J. Olmr, Sheboygan; Todd R. Gerhardt, Grafton; Robert C. Hamann, Sheboygan, all of Wis.

[73] Assignee: Kohler Co., Kohler, Wis.

[21] Appl. No.: 283,973

[22] Filed: Aug. 1, 1994

Related U.S. Application Data

[63] Continuation-in-part of Ser. No. 36,609, Mar. 24, 1993, abandoned.

[51] Int. Cl.$^6$ ........................................... G05G 1/00
[52] U.S. Cl. ..................... 74/579 E; 74/579 R; 411/399; 29/888.09
[58] Field of Search ............................... 74/579 E, 579 R; 29/888.09, 888.091, 888.092; 123/197.3, 197.4; 411/399

[56] References Cited

U.S. PATENT DOCUMENTS

| | | | |
|---|---|---|---|
| 491,727 | 2/1893 | Maloney | 74/579 E |
| 678,021 | 7/1901 | Neely | 74/579 E |
| 1,009,244 | 11/1911 | Hartsough | 74/579 E |
| 1,057,270 | 3/1913 | Primm | 74/579 E |
| 1,130,982 | 3/1915 | Kinkead | 74/579 E |
| 1,151,339 | 8/1915 | Browning | 74/579 E |
| 1,179,194 | 4/1916 | Lane | 74/579 E |
| 1,226,603 | 5/1917 | Sheldrup | 74/579 E |
| 1,253,841 | 1/1918 | Krieg | 74/579 E |
| 1,385,894 | 7/1921 | Schnelle | 74/579 E |
| 1,400,829 | 12/1921 | Oakley . | |
| 1,509,022 | 9/1924 | Noble | 74/579 E |
| 1,733,643 | 10/1929 | Bot | 74/579 E |
| 1,786,934 | 12/1930 | Briggs | 74/579 E |
| 2,567,555 | 9/1951 | Davis | 74/579 E |
| 2,741,933 | 4/1956 | Seitz | 74/579 E |
| 3,285,098 | 11/1966 | Beveridge | 74/579 R |
| 3,482,468 | 12/1969 | DeBiasse | 74/579 E |
| 3,576,353 | 4/1971 | Barker | 74/579 E |
| 3,751,080 | 8/1973 | Bailey et al. | 287/52.03 |
| 3,818,577 | 6/1974 | Bailey et al. | 29/413 |
| 4,030,179 | 6/1977 | Schwarz | 29/156.5 A |
| 4,184,384 | 1/1980 | Levine | 74/579 E |
| 4,198,879 | 4/1980 | Hornak et al. | 74/579 E |
| 4,422,348 | 12/1983 | Campbell | 74/579 |
| 4,458,555 | 7/1984 | Holtzberg et al. | 74/579 |
| 4,494,286 | 1/1985 | Kaufman | 29/156.5 |
| 4,541,304 | 9/1985 | Chikugo | 74/579 E |
| 4,569,109 | 2/1986 | Fetouh | 29/156.5 |

(List continued on next page.)

FOREIGN PATENT DOCUMENTS

| | | | |
|---|---|---|---|
| 513828 | 3/1950 | Canada | 74/579 E |
| 897838 | 4/1945 | France | 74/579 E |
| 1193651 | 11/1959 | France | 74/579 E |
| 1962116 | 2/1979 | Germany | 74/579 E |
| 2807298 | 8/1979 | Germany | 74/579 E |
| 573441 | 11/1945 | United Kingdom | 74/579 E |
| 2078337 | 1/1982 | United Kingdom | 74/579 R |
| 2211272 | 6/1989 | United Kingdom | 74/579 E |
| 86/04122 | 7/1986 | WIPO | 74/579 E |

OTHER PUBLICATIONS

Undated, admitted prior art, page from a brochure of Alumax Aluminum Corporation for its extrusion process.
Undated, admitted prior art, p. 3 of a brochure of Michigan Precision Industries, Inc. for its fineblanking process.

*Primary Examiner*—Vinh T. Luong
*Attorney, Agent, or Firm*—Quarles & Brady

[57] ABSTRACT

A one-bolt connecting rod for an internal combustion engine, compressor or other machine; a structure for aligning the shank and cap parts of a two-piece connecting rod; an aluminum fastener for aluminum connecting rods; an extrusion process for making connecting rods; and connecting rod parts made by a fine blanking process. In the one-bolt connecting rod, the unbolted junction of the shank and cap is of the hook-on-lug type, and the bolt runs longitudinally through the junction. The alignment structure is on one side a V-junction with contact only between slanting walls and on the other side a junction of two single-plane walls. The aluminum fastener is a threaded aluminum stud.

3 Claims, 5 Drawing Sheets

U.S. PATENT DOCUMENTS

| | | | |
|---|---|---|---|
| 4,680,829 | 7/1987 | Baumgarten | 16/114 A |
| 4,684,267 | 8/1987 | Fetouh | 384/294 |
| 4,688,446 | 8/1987 | Ishikawa | 74/579 |
| 4,802,269 | 2/1989 | Mukai et al. | 29/149.5 |
| 4,836,044 | 6/1989 | Lobig | 74/579 E |
| 5,036,727 | 8/1991 | Engel | 74/579 R |
| 5,109,605 | 5/1992 | Hoag et al. | 74/579 E |
| 5,165,882 | 11/1992 | Shimizu et al. | 418/270 |
| 5,197,425 | 3/1993 | Santi | 74/579 E X |
| 5,243,878 | 9/1993 | Santi | 74/579 R |
| 5,326,273 | 7/1994 | Kamon et al. | 439/92 |

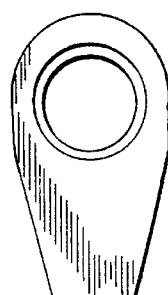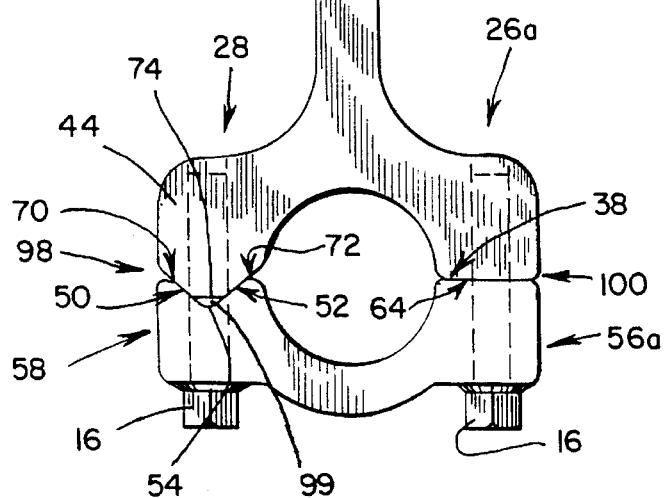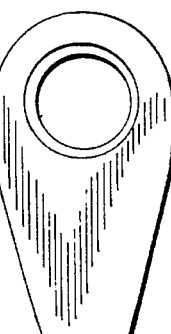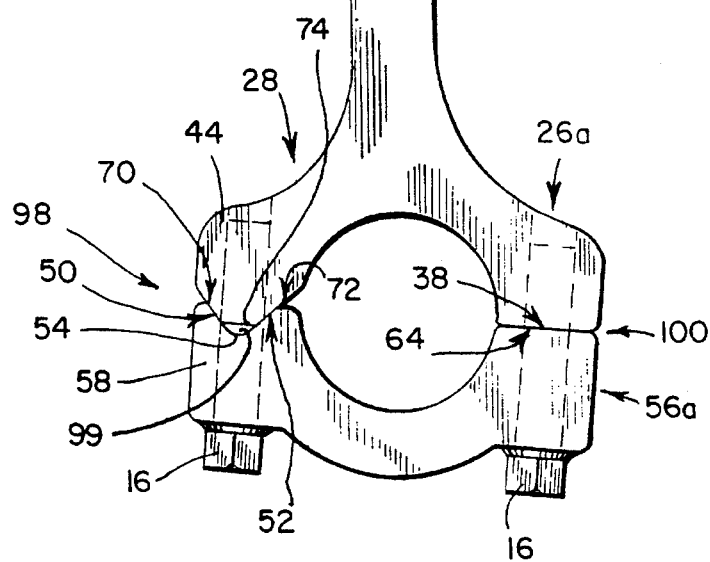
FIG. 10
FIG. 11

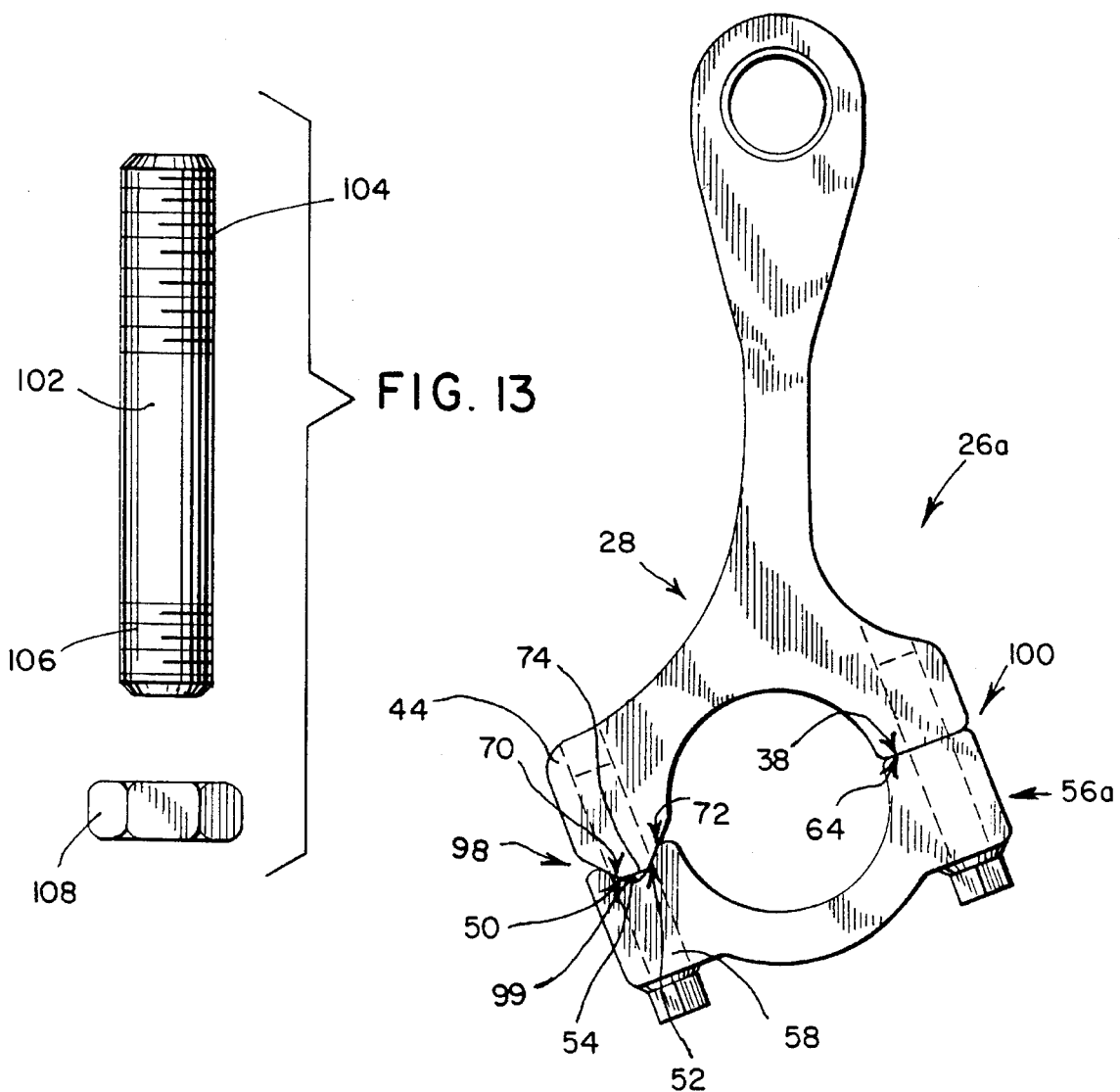

CONNECTING ROD

This application is a continuation-in-part of U.S. patent application Ser. No. 08/036,609 filed Mar. 24, 1993.

BACKGROUND OF THE INVENTION

1. Field of the Invention

The invention relates to connecting rods. More particularly it relates to connecting rods used in internal combustion engines and compressors to connect a crankshaft to a piston.

2. Description of the Art

In conventional internal combustion engines, connecting rods transmit the reciprocating motion of the pistons to the crankshaft and thereby convert it to rotary motion. For ease of assembly, the rod is usually formed with a main shank that has a top bore for receiving a piston connector and a lower part that partially surrounds the crankshaft. The rod also has a cap which extends the rest of the way around the crankshaft. The cap and shank are bolted together to sandwich the crankshaft.

Connecting rods are subject to stress, shock and temperature (and thus wear) as they rapidly change from being compressed to being tensed. Moreover, it is highly desirable to make the connecting rods as light as possible. This has lead to the use of aluminum, other lightweight metals and even plastic. However, the use of these materials creates other design problems. In particular, it is generally necessary to use steel bolts to connect the shank part of the connecting rod with the cap part. When two bolts are used for this purpose, the difference between the thermal coefficients of expansion of the steel bolt and the aluminum rod tends to cause wear and reduced efficiency.

In order to reduce the problem of uneven thermal expansion, as well as to reduce weight and assembly and repair costs, connecting rods employing only one bolt have been used. Many of these use a bolt extending crosswise through legs located either on the rod's shank or cap, either above or below the crankpin opening. See U.S. Pat. Nos. 491,727; 678,021; 1,009,244; 1,130,982; 1,253,841; 3,576,353; 4,541,304; and 4,836,044. In these rods, the bolt is subject to substantial shearing forces, may not effectively maintain a round crankpin opening and may require additional parts to properly align the crankpin opening.

Some others have employed a bolt generally in line with the longitudinal axis of the connecting rod, but these have also used additional parts to maintain alignment and rounding of the crankpin opening and in many cases have employed opposite the bolt a hinged junction, a complexity which increases the cost of manufacturing and can cause reliability problems. See U.S. Pat. Nos. 1,226,603 and 1,786,934.

There remains a need for a single bolt connecting rod in which the bolt is oriented so that substantial shear forces are avoided, and which eliminates the need for a separate part to cause correct alignment of the crankpin opening.

In small engines the connecting rod shank is often flared wider near the interface with the cap in order to provide separation from adjoining shanks or crankshaft arms. Flaring the shank is difficult in an extrusion or fine blanking process. Thus, there is a need to provide separation while allowing the shank to be of a uniform width.

Another problem is that connecting rods are generally made in a relatively expensive die-casting process. Parts so produced usually require additional machining to achieve required tolerances. In addition, some percentage of the rods produced by the die-cast process are unusable because of excess porosity. The die-cast process therefore entails substantial labor, inspection, and scrapping costs.

Accordingly, there is a need to reduce the costs of manufacturing, installing and repairing connecting rods. A further need is to provide a lightweight connecting rod with good wear characteristics. A further need is to find a way to eliminate the use of connecting rod spacers.

SUMMARY OF THE INVENTION

The invention provides a connecting rod capable of linking a piston to a moveable part of a crankshaft assembly. The connecting rod includes a shank which has a first end suitable to be connected to the piston and a forked opposite end with two legs. There is also a cap in the form of an arc having two arc-ends. A fastener receiving means on a first leg of the shank and a first arc-end of the cap can receive a fastener.

The cap and the shank are formed so that when they abut each other the first leg of the shank and the first arc-end of the cap form a male/female junction while a second leg of the shank and a second arc-end form a hook-on-lug junction. When the cap and shank abut in this manner, they form between them an aperture for receiving the moveable part. The male/female junction is on one side of the aperture, and the hook-on-lug junction is on the opposite side.

When the cap and shank so abut, the fastener can secure the cap to the shank via the fastener receiving means. During the fastening, a tightening of the fastener will move the first leg of the shank and the first arc-end of the cap toward each other to define a first direction while at the same time will move the second arc-end at least partially transverse to the first direction.

The invention allows one bolt fastening and provides a securely rounded crankpin opening without the use of an additional aligning part. Assembly time is reduced by virtue of the use of only one bolt. The difference between the relative heat expansion of the bolt and the connecting rod material does not affect the roundness of the crankpin opening as severely as in two-bolt designs. The hook-on-lug junction eliminates the need for a separate hinge and thereby reduces manufacturing cost and increases durability. The design is lightweight, and enables the use of an extrusion process to make the connecting rod parts as the male/female junction self corrects for tolerance differences.

In another aspect, the invention provides a connecting rod cap which is thicker than the shank. This allows the cap to serve as a spacer. Widening the cap allows the width of the shank to be uniform and thereby facilitates manufacturing by the extrusion and fine blanking processes discussed below.

In another aspect, the invention provides an extrusion process for making a connecting rod part—i.e., the shank or the cap. The first step of the process is to provide a die having an outlet with the size and shape of the periphery of the part. Second, there is provided a charge of material capable of being extruded when heated. Next the material is heated, and then the heated materials extruded through the outlet of the die. The resulting material has the size and shape of the periphery of the desired part. A part having the desired thickness is then separated from the extruded material, as by cutting.

In another aspect, the invention provides a connecting rod cap or connecting rod shank manufactured by a fine blanking process. There is provided a die plate having an opening of the size and shape of the periphery of the part. A punch which has the size and shape of the periphery of the part is aligned with the opening of the die plate. Within the opening of the die plate there is a moveable anvil urged by counterpunch pressure towards the punch. A sheet of connecting rod part material is provided between the punch and the die plate. The sheet of material is then immobilized relative to the die plate. The punch is forced through the sheet of material and, overcoming the counterpunch pressure of the moveable anvil, pushes a portion of the material into the opening. A fastener receiving hole is then formed in the part.

In yet another aspect, the invention provides a structure for aligning the shank portion and the cap portion of a connecting rod which requires little or no machining on the adjoining faces of these two portions. This is particularly helpful in the case of connecting rods made by an extrusion process. Previously known connecting rods require machining the alignment features of the shank and cap parts to provide the precise tolerances needed to ensure full alignment of the alignment features. An alternative approach has been initially making the piston rod in one piece and then broaching or fracturing it into two pieces which have alignment features which necessarily fit precisely together. Eliminating these operations and using the parts "as is" can dramatically reduce the manufacturing costs for the connecting rod because perfecting the fit of the alignment features accounts for a substantial portion of the cost of manufacturing a prior art rod.

More specifically in that regard, the invention provides a connecting rod which has a shank having a first end suitable to be connected to the piston and a forked opposite end having a first leg and a second leg. The legs have arcuate facing inner surfaces which meet and together define a fraction of an aperture capable of receiving a movable part of a crankshaft assembly. The rod also has a forked cap having a first arc-end and a second arc-end. The arc-ends have arcuate facing inner surfaces which meet and together define the remaining fraction of the aperture capable of receiving the movable part. An end of the first shank leg or the first arc-end carries a V-shape protrusion having two slanting, single-plane protrusion walls, and an end of the other of the first shank leg or the first arc-end carries a V-shape indentation having two slanting single-plane indentation walls. The protrusion and indentation are formed so that when the shank and the cap are adjoined to form the aperture the pair of protrusion walls is aligned with and abuts the pair of indentation walls and this contact is the only contact between the first shank leg and the first arc-end. Further, each of the second shank leg and the second arc-end culminates in a single-plane wall oriented so that the two single-plane walls abut each other when the shank and the cap are adjoined to form the aperture. The connecting rod also includes a fastener adapted to secure the shank and the cap together to form the aperture.

In one aspect, the two protrusion walls do not intersect but rather are truncated so that the protrusion has a clipped V-shape. In another aspect, the protrusion walls are at right angles to each other, and the indentation walls are at right angles to each other.

In a further aspect, the invention addresses a problem with connecting rods made of aluminum (or other materials whose coefficient of thermal expansion is similar to that of aluminum). As aluminum connecting rods were developed, the standard practice of using steel bolts to fasten the shank and the cap together was simply followed. Unfortunately, steel and aluminum expand at different rates under heat— i.e., there is a thermal expansion mismatch. As a result, the crankpin opening will ovalize under heat if the fastener is steel and the connecting rod is aluminum. This increases wear on the connecting rod and on the crankpin. The thermal expansion mismatch can loosen the bolted joint, eventually leading to the failure of the connecting rod and damage to the crankshaft assembly. For these reasons, an aluminum rod fastened by the standard steel bolt is more likely to fail, especially in conditions of low oil and associated high temperatures, than a steel rod. Counter-intuitively and contrary to standard practice in the art, it has been found that using one or two aluminum fasteners can provide sufficient strength and rigidity in an aluminum rod while significantly improving the thermal expansion match between the fastener and the connecting-rod components and thereby substantially alleviating the effects described above.

In this regard, the invention provides a connecting rod which has a shank adapted to be connected at one end to a piston and at the other end to form a fraction of an aperture capable of receiving a movable part of a crankshaft assembly. The rod also has a cap adapted to adjoin the shank and thereby to define the remaining fraction of the aperture. The rod also has an aluminum threaded fastener adapted to secure the shank and the cap in an adjoined position.

The objectives of the invention include a reduction in the cost of manufacturing, installing and repairing connecting rods. A further objective is to provide a lightweight connecting rod with good wear characteristics. Eliminating the use of separate connecting rod spacers is another objective. Finally, a further objective is to provide methods for making such connecting rods.

These and still other objects and advantages of the invention will be apparent from the description which follows. The preferred embodiments will be described in reference to the accompanying drawings. These embodiments do not represent the full scope of the invention. Rather, the invention may be employed in other embodiments. Reference should therefore be made to the claims herein for interpreting the breadth of the invention.

BRIEF DESCRIPTION OF THE DRAWINGS

FIGS. 10–12 illustrate three two-bolt connecting rods which embody the alignment structure claimed herein; and FIG. 13 illustrates an aluminum fastener.

DESCRIPTION OF THE PREFERRED EMBODIMENTS

Figure 1:
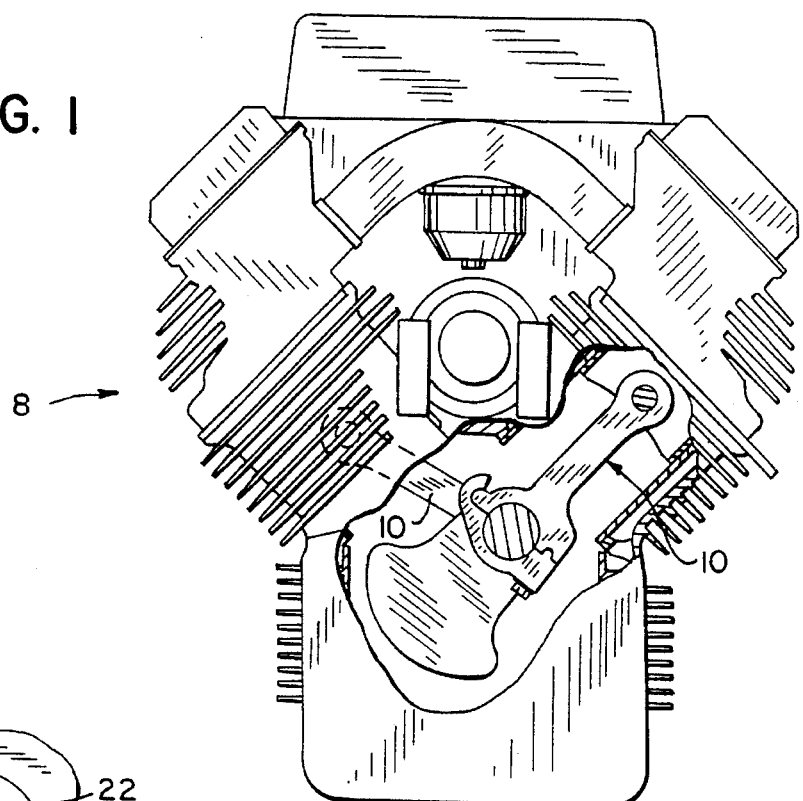
FIG. 1 shows connecting rods embodying the present invention installed in a V-2 engine.

FIG. 1 shows a two cylinder internal combustion engine 8 having a connecting rods 10 embodying the present invention. Each connecting rod 10 preferably includes only three parts: a shank 12, an arcuate cap 14 and a bolt 16.

Shank 12 comprises an elongated central portion 17 which supports at one end an enlarged head 18 and at the other end an enlarged cap-mounting portion 20. The head 18 is conventionally formed to suitably receive a pin 22 of an engine piston 24. The cap-mounting portion 20 is bifurcated into two legs, lugged leg 26 and indented "female" leg 28. The facing, inner surfaces of legs 26 and 28 form a semi-circular surface 30 which forms one-half of the aperture for receiving the crankpin 32 of the engine crankshaft.

Figure 2:
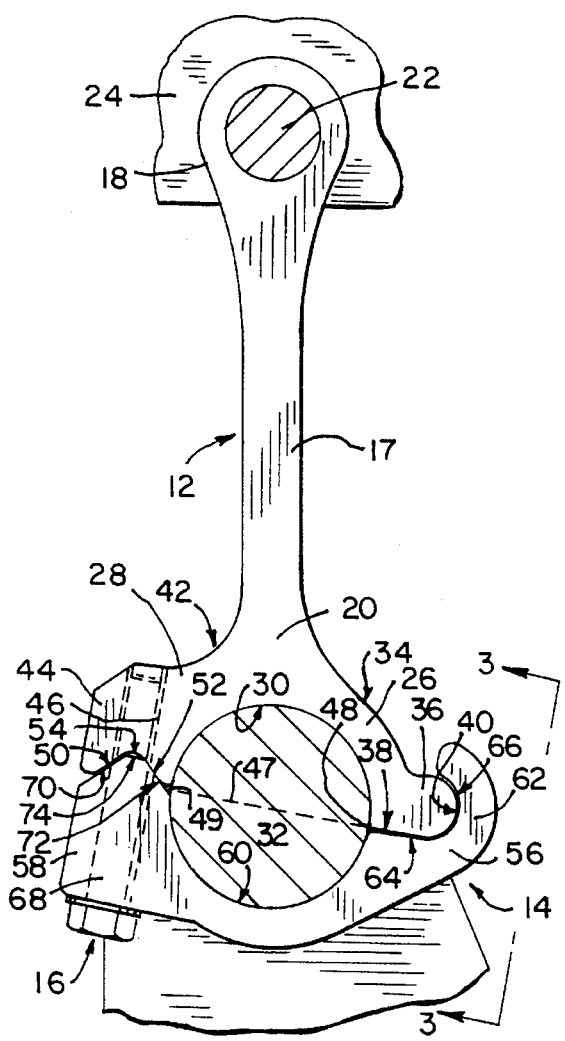
FIG. 2 is a side elevational view of a connecting rod of the present invention with fragments of the piston and crankshaft showing.
Figure 3:
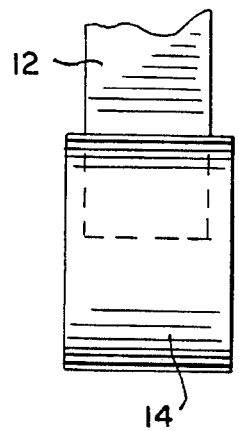
FIG. 3 is an enlarged partial cross-sectional view taken along line 3—3 of FIG. 2.
Figure 4:
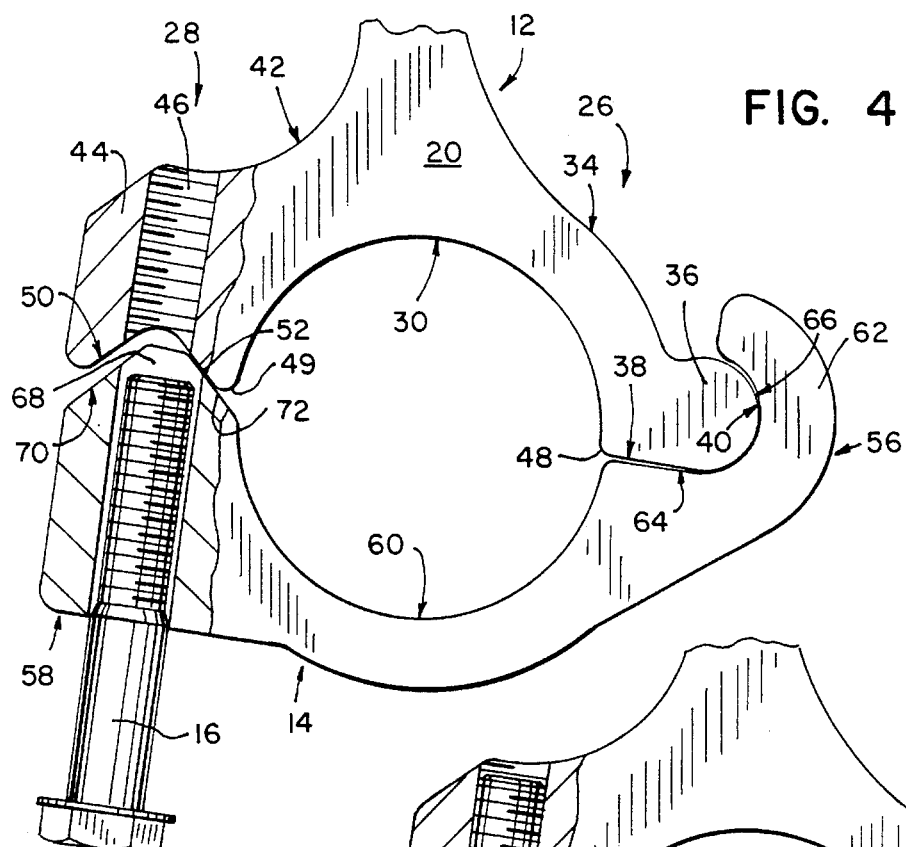
FIG. 4 is an enlarged side elevational view, with parts broken away showing the junctions of the shank and the cap prior to fastening them together with the bolt.
Figure 5:
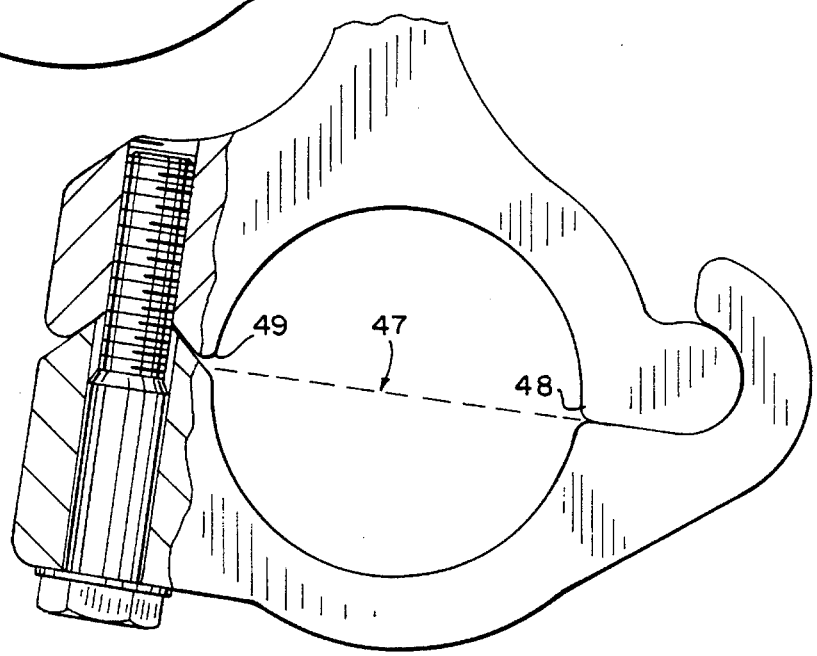
FIG. 5 is similar to FIG. 4 except that the bolt has been fastened.

Lugged leg 26 of shank 12 extends outward and downward (as viewed in FIG. 2) from central portion 16 in an arcuate manner. The outer surface 34 bulges outward at the end of leg 26 to form thumblike lug 36. Lug 36 includes a flat lower surface 38, which forms the bottom of leg 26 and which merges into a semi-circular outwardly protruding surface 40.

The outer surface 42 of leg 28 curls outward and downward to form a lower leg 44. Lower leg 44 has an internal threaded bore 46 whose longitudinal axis is perpendicular to line 47 which extends between the lower ends 48 and 49 of the facing inner surfaces of legs 26 and 28 respectively.

Figure 6:
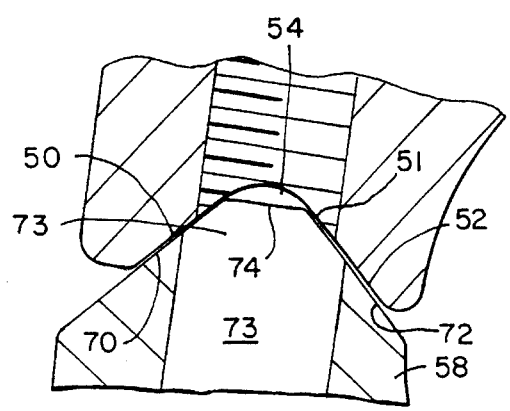
FIG. 6 is an enlarged cross-sectional view showing a preferred embodiment of the male/female junction.

In the embodiment of FIG. 6, the lower surface of lower leg 44 is indented by a "female" groove 51 having sloping sides 50 and 52 which join at valley 54. The sides 50 and 52 of the groove may be straight as shown in the figures, or they may be curvilinear. As will be seen, the indented lower surface of lower leg 44 serves as a female component of a male/female mounting junction, and in one particular aspect, as groove 51 of a tongue-in-groove connection.

The second component of connecting rod 10, cap 14, has a generally arcuate shape which comprises hook arc-end 56 and male arc-end 58. The inner facing surfaces of arc-ends 56 and 58 form a semi-circular surface 60 which join with semi-circular surface 30 of shank 12 to form the complete aperture for the crankpin 32.

Hook arc-end 56 culminates in a hook 62 which (as viewed in FIG. 2) curls upward and then inward. The inner surface of hook 62 includes flat surface 64 which can be aligned with flat surface 38 of lug 36 and a semi-circular surface 66 which can be aligned with semi-circular surface 40 of lug 36.

Male arc-end 58 of cap 14 has an internal through bore 68 which is coaxially alignable with bore 46 when cap 14 is fastened to shank 12. In the embodiment of FIG. 6, the upper end of male arc-end 58 is tapered and includes slanting sides 70 and 72 (referred to in the claims as "planar first tongue wall" and "planar second tongue wall" respectively) which are designed to align with sides 50 and 52 (referred to in the claims as "planar first groove wall" and "planar second groove wall" respectively) which form the groove in the end of lower leg 44 of cap 14. As shown in FIGS. 2, 4, 5 and 6, the only areas of contact between leg 28 of the shank 12 and arc-end 58 of the cap 14 are the co-planar first junction of slanting side 50 of lower leg 44 with slanting side 70 of the arc-end 58 and the co-planar second junction of slanting side 52 of lower leg 44 with slanting side 72 of arc-end 58. That is, there are no surfaces of lower leg 44 or arc-end 58 which are in contact other than slanting sides 50 and 70 and slanting sides 52 and 72 respectively. The peak or tongue 73 of the tapered end is truncated by flat surface 74.

Figure 7:
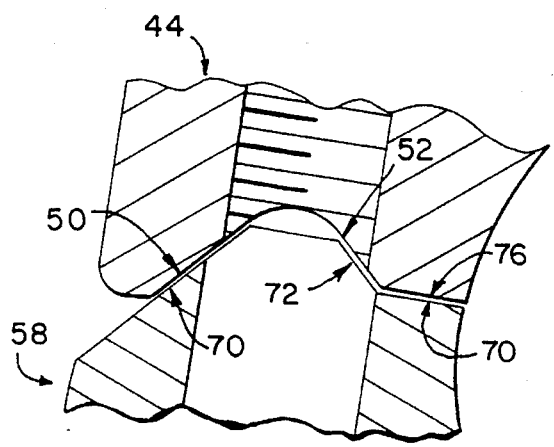
FIG. 7 is an enlarged cross-sectional view of another embodiment of that junction.

FIG. 7 shows another embodiment of the junction of lower leg 44 of the shank 12 with male arc-end 58 of cap 14. In this embodiment, lower leg 44 and male arc-end 58 have abutting surfaces 76 and 78 respectively which adjoin sides 52 and 72 respectively and which are at least partially transverse to the direction of sides 52 and 72. Alternatively, surfaces 76 and 78 could adjoin surfaces 50 and 70 respectively.

The third and final component of connecting rod 10 is threaded bolt 16. It is made of steel and is chosen to be able to slidably move through bore 68 of arc-end 58 and to be threadably inserted into bore 46 of lower leg 44 of shank 12.

To assemble the connecting rod, semi-circular surface 66 of hook 62 is juxtaposed to surface 40 of lug 36, and sides 50 and 52 of the groove of lower leg 44 are juxtaposed with sides 70 and 72 respectively of male arc-end 58. Bolt 16 is inserted from the bottom of male arc-end 58 through bore 68 and is screwed into bore 46 of lower leg 44.

In one aspect of the invention, the tongue 73 of male arc-end 58 is slightly inset toward the crankpin aperture relative to the groove 51 of lower leg portion 44. For example, in one embodiment, the distance from the outermost point on lug 36 to the middle of tongue 73 is 51.3 millimeters while the corresponding distance to the middle of groove 51 is 51.5 millimeters.

As a result, when cap 14 is loosely juxtaposed against the legs of shank 12, bores 68 and 46 do not perfectly align and the crankpin opening is slightly out of round. Tightening screw 16 causes male arc-end 58 to move toward lower leg portion 44 approximately along an axis perpendicular to line 47 and also causes cap 14 to move to the left (in the perspective of FIG. 2) approximately along the axis of line 47. This firmly locks hook 62 against lug 36, rounds out the crankpin opening and locks surface 72 against surface 52. The resulting tension diminishes the risk that bolt/fastener 16 will loosen and therefore continually maintains a round crankpin opening.

Figure 8:
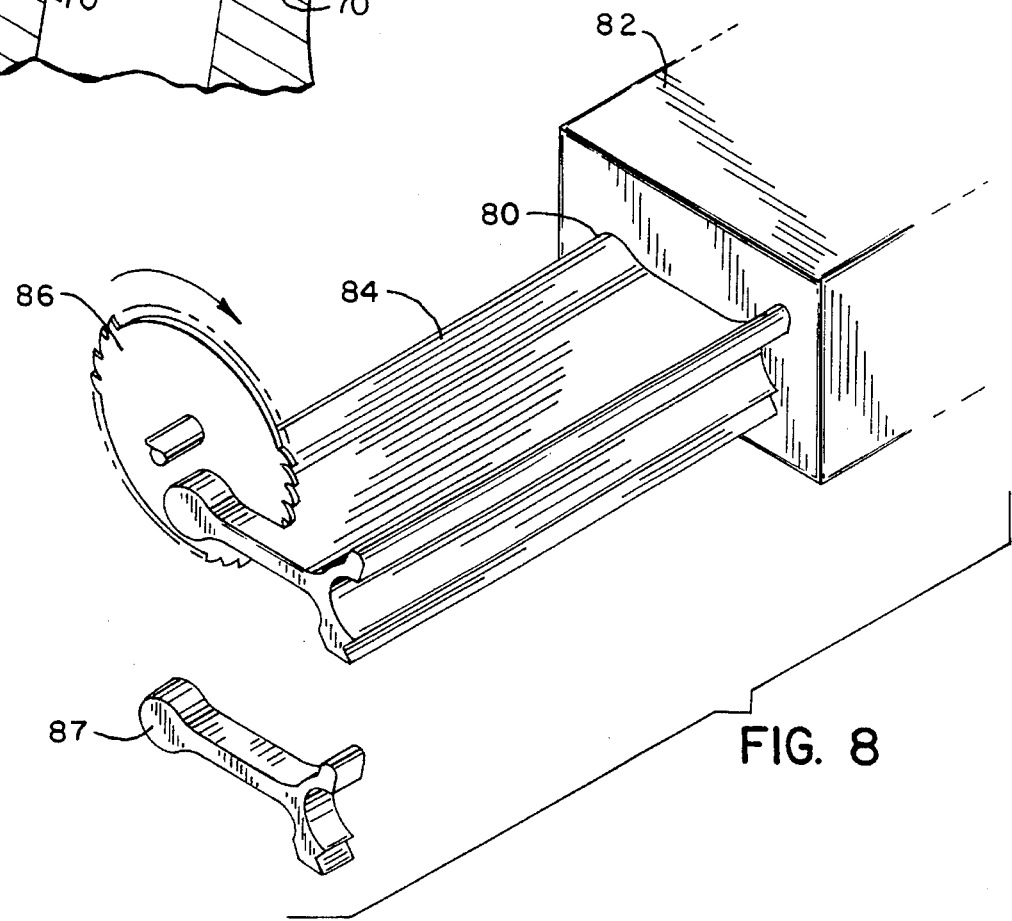
FIG. 8 is a schematic view of the preferred extrusion process.

To make the connecting rod shank by an extrusion process as represented in FIG. 8, a die 80 is preferably constructed which has the desired elevational (as in the perspective of FIG. 2) shape. This die 80 is mounted at the end of a heating chamber 82 into which a charge of material, such as aluminum, is placed. The chamber is then closed except for the outlet provided by the die. The aluminum is then heated to a semi-molten state. The semi-molten aluminum is then forced through the die hole by an extrusion ram. As a result, there is extruded from the die an aluminum piece 84 which has the FIG. 2 elevational shape of the crankshaft shank. A saw 86 is used to cut separate crankshaft shanks 87 each having the desired width.

The one-bolt design, and the lack of any additional parts, offsets the normal weight disadvantages of the extrusion process. Also, the shapes of the connecting portions of the apparatus aspect of the present invention are sufficiently rounded to be made effectively and efficiently by such an extrusion process. Thirdly, the nature of the present invention is such that relatively loose tolerances can be used. The cap can be made in a similar manner.

Figure 9:
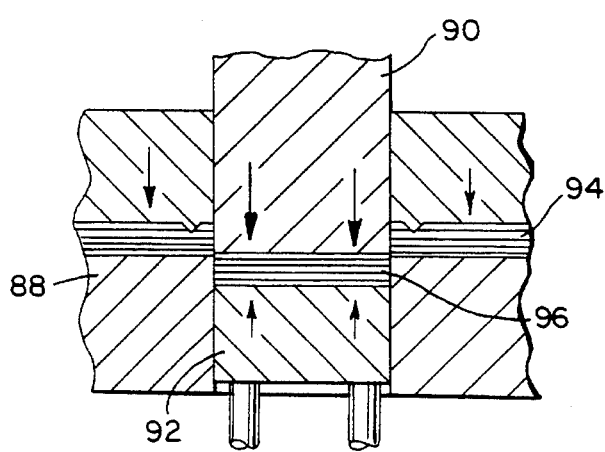
FIG. 9 is a schematic view of the preferred fine blanking process.

The connecting rod shank and cap of the present invention may also advantageously be made using a "fine blanking" process, which is represented schematically in FIG. 9. A die plate 88 is formed to have an opening of the size and shape of the periphery of the part. A punch 90 also of that size and shape is aligned with the opening. In the opening of the die plate 88, there is a moveable anvil 92, which is urged toward the punch by a counterpunch pressure. A sheet 94 of material is introduced between the punch 90 and the die plate 88 and is immobilized relative to the die plate 88. The punch 90 is forced through the sheet of material and, overcoming the counterpunch pressure, pushes a portion 96 of the material into the opening. The portion 96 has the shape of the connecting rod part.

The male/female (also known as tongue-in-groove) junction illustrated in FIGS. 2, 4, 5 and 6 and described above may be employed (with or without a lateral offset) in a two-bolt connecting rod as well as in a single-bolt connecting rod as described above. Three embodiments of such two-bolt connecting rods are illustrated in FIGS. 10, 11 and 12. In FIGS. 10–12, the lower leg 44 of the shank is the male component and the arc-end 58 of the cap is the female component, which is the reverse of the single-bolt embodiment shown in FIGS. 2, 4, 5 and 6. However, either arrangement of the male and female components may be employed on any of the connecting embodiments of the present invention. In FIGS. 10–12, the male slanting sides 70, 72 and the female slanting sides 50, 52 are identified with the same numbers as used for their counterparts in FIGS. 2, 4, 5 and 6. They form a V-junction 98.

It has been found advantageous to design the lower leg 44 and the arc-end 58 so that walls 70 and 72 are at approximately right angles to each other, walls 50 and 52 are approximately at right angles to each other and the area of contact between wall 70 and wall 50 is approximately the same as the area of contact between wall 72 and wall 52. The tip 74 of the male portion of lower leg 44 is truncated to avoid any contact between it and the valley 54 of arc-end 58 so that the only contact is between slanting walls 70 and 50 and 72 and 52 respectively. The truncation of the tip 74 of the male portion of lower leg 44 leaves a non-contact space 99 between the tip 74 and the valley 54.

In the two-bolt embodiments of FIGS. 10–12, the other junction (i.e., the junction of the lugged leg 26 of the shank with the hook arc-end 56 of the cap as seen in FIGS. 2, 4, 5 and 6) has been replaced by a single-plane junction 100. To accomplish this, the thumb-like lug 36 of leg 26 and the hook 62 of hook arc end 56 have been eliminated so that the only point of contact between leg 26a and arc-end 56a is the adjoining single plane of surfaces 38 and 64 respectively. The junction 100 (referred to in the claims as the "co-planar third junction") is maintained by a fastener, such as a bolt 16 extending longitudinally through a bore in leg 26a and arc-end 56a.

An advantage of the embodiments of FIGS. 10–12 is the elimination of the need to have precisely matching features in the shank and the cap, thereby eliminating machining, broaching or fracturing steps in the manufacturing process. The V-junction 98 on one side and the single-plane junction 100 on the other side allows the shank and the cap portions to be used "as is"—i.e., as produced in the extrusion, blanking or casting process. Specifically, if wall 70 and wall 50 (and/or wall 72 and wall 52) deviated from single slanting planes, so that the V-junction 98 included both slanting walls and lateral surfaces, the pieces would likely have to be made or machined to precise tolerances to insure that both the lateral surfaces and the slanting surfaces were in full contact. Similar precision would be required on the other side if junction 100 included any alignment feature.

In another aspect, the steel bolt 16 employed in the embodiments of FIGS. 2–6 and 10–12 may be replaced by an aluminum fastener in those applications in which the connecting rod parts are made of aluminum. Because the aluminum fastener and the aluminum shank and cap have very similar coefficients of thermal expansion, the aperture for the crankshift pin remains more nearly round as the engine heats up, rather than becoming increasingly oval as occurs when steel bolts are used. FIG. 13 shows an embodiment of an aluminum fastener which could replace steel bolt 16. It comprises an aluminum stud 102 threaded on both ends 104, 106 and a steel nut 108. In the embodiments illustrated in the drawings, threaded end 104 is screwed into threaded bores in the shank legs and the threaded end 106 passes freely through bores in the cap arc ends and extends out of the cap to accept nut 108. The connecting rod parts and the stud 102 do not have to be of exactly the same aluminum alloy because the coefficients of thermal expansion of all common aluminum alloys fall in a fairly narrow range. It has been found that a stud 102 made from 2024 T4 aluminum is satisfactory. It is often preferable that stud 102 be slightly wider than steel bolt 16 to achieve the necessary strength. A steel (rather than aluminum) nut has the advantages of being readily available as a stock item and of increasing the strength of the joint. However, an aluminum nut could be used in some applications, or an aluminum bolt could be used in lieu of the aluminum stud and steel nut.

Although the especially preferred embodiments of the invention have been described above, the invention claimed is not so restricted. There may be other modifications and changes to these embodiments which are within the scope of the invention. For example, the bolt can be extended through the shank leg and fastened in place with a nut. Further, the hook-on-lug and the male/female junctions may be shaped in many different ways which are within the scope of the invention. For example, the male and female parts could be more cylindrical. Also, the female part could be on the cap, with the male part on the leg. Moreover, the extrusion and fine blanking processes may be used with materials in addition to aluminum. Thus, the invention is not to be limited by the specific description above, but rather should be judged by the claims that follow.

We claim:

1. A connecting rod for linking a piston to a movable part of a crankshaft assembly, the connecting rod comprising:
   (a) a shank having a first end adapted for connection to the piston and a forked opposite end having a first leg and a second leg which define an arcuate inner shank surface;
   (b) a forked cap having a first arc-end and a second arc-end which define an arcuate inner cap surface, the inner shank surface and the inner cap surface forming an aperture for receiving the movable part when the shank and the cap are adjoined;
   (c) wherein an end of the first shank leg or the first arc-end is a tapered tongue having a planar first tongue wall and a planar second tongue wall which slant toward each other, and wherein an end of the other of the first shank leg or the first arc-end has a tapering groove having a planar first groove wall and a planar second groove wall which slant toward each other, the tongue and the groove being formed so that when the shank and the cap are adjoined to form the aperture the tongue is engaged in the groove and the only contact between the first shank leg and the first arc-end is a co-planar first junction between the first tongue wall and the first groove wall and a co-planar second junction between the second tongue wall and the first groove wall;
   (d) wherein the second shank leg culminates in a single, planar shank wall and the second arc-end culminates in a single, planar arc-end wall, the shank wall and the arc-end wall abutting each other in a co-planar third junction when the shank and the cap are adjoined to form the aperture; and
   (e) a fastener adapted to secure the shank and the cap together to form the aperture.

2. A connecting rod as recited in claim 1, wherein an end of the tongue is truncated, forming a non-contact space in the groove between the first shank leg and the first arc-end.

3. A connecting rod as recited in claim 1, wherein the first tongue wall and the second tongue wall are at right angles to each other and the first groove wall and the second groove wall are at right angles to each other.

* * * * *